(12) United States Patent
deCarmo

(10) Patent No.: US 7,398,547 B2
(45) Date of Patent: Jul. 8, 2008

(54) HIGH-BANDWIDTH DIGITAL CONTENT PROTECTION DURING RAPID CHANNEL CHANGING

(75) Inventor: Linden deCarmo, Plantation, FL (US)

(73) Assignee: Pace plc., West Yorkshire (GB)

( * ) Notice: Subject to any disclaimer, the term of this patent is extended or adjusted under 35 U.S.C. 154(b) by 786 days.

(21) Appl. No.: 10/847,852

(22) Filed: May 19, 2004

(65) Prior Publication Data

US 2005/0154917 A1 Jul. 14, 2005

Related U.S. Application Data

(60) Provisional application No. 60/535,827, filed on Jan. 13, 2004.

(51) Int. Cl.
*G06F 17/30* (2006.01)
*G06F 17/00* (2006.01)

(52) U.S. Cl. .............................. 726/3; 726/11; 726/15
(58) Field of Classification Search ............... 726/4, 726/5, 6, 3, 11, 15
See application file for complete search history.

(56) References Cited

U.S. PATENT DOCUMENTS

2003/0126457 A1 7/2003 Kohiyama et al.

FOREIGN PATENT DOCUMENTS

WO  WO 03/071413  8/2003

OTHER PUBLICATIONS

Silicon Image, High-bandwidth Digital Content Protection, White Paper, Feb. 2000.*
http://tools.ietf.org/html/draft-ietf-roamops-cert-01, year 1999.*
Interactive maps for a digital video library, Christel, M.G.; Olligschlaeger, A.M.; Huang, C.; Multimedia, IEEE, vol. 7, Issue 1, Jan.-Mar. 2000 pp. 60-67.*
Study of Digital Video Interface (DVI) Hardware Design In Multimedia System, Xiaoping, Bai; Hongwei, Zhang; Microelectronics and Electron Devices, 2007 IEEE Workshop on 20-20 Apr. 2007 pp. 37-39.*
SDV unscrambled, Rayner, A.; Optical Fibre Video, Audio and Data Systems (Digest No. 1997/038), IEE Colloquium on Jan. 28, 1997 pp. 2/1-2/6.*
Jim Lyle, Silicon Image Inc, "HDCP: What it is and how to use it", *EDN*, Apr. 18, 2002, pp. 73, 74, 76,78,80, and 81, Design Feature.

* cited by examiner

*Primary Examiner*—David Jung
(74) *Attorney, Agent, or Firm*—Chinh H. Pham; Greenberg Traurig, LLP

(57) ABSTRACT

A method and apparatus are disclosed for providing High-Bandwidth Digital Content Protection during a channel change process. The method and apparatus include detection of High-Bandwidth Digital Content Protection capability on a receiver during an interface event. High-Bandwidth Digital Content Protection authentication is delayed for a predetermined time period to allow the channel change process to stabilize. The invention reduces a performance penalty associated with the channel change process.

18 Claims, 2 Drawing Sheets

HIGH-BANDWIDTH DIGITAL CONTENT PROTECTION DURING RAPID CHANNEL CHANGING

REFERENCE TO RELATED APPLICATION

This application claims priority to co-pending U.S. provisional patent application Ser. No. 60/535,827, filed Jan. 13, 2004, whose disclosure is incorporated by reference in its entirety into the present disclosure.

FIELD OF THE INVENTION

The present invention is generally related to High-Bandwidth Digital Content Protection and, more particularly, is related to a method and apparatus for High-Bandwidth Digital Content Protection during a channel change process.

BACKGROUND

High-bandwidth digital content protection (HDCP) is a specified method developed by Digital Content Protection, LLC, for protecting copyrighted digital content that uses an interface such as Digital Video Interface (DVI). FIGS. 1 and 2 illustrate basic examples of HDCP systems. In FIG. 2, the HDCP system 200 encrypts the digital content transmission between a video source 204 (set-top box, computer, DVD, etc.) and a receiver or display 206 (Liquid Crystal Display, television, etc.) via DVI 202.

FIG. 1 illustrates an HDCP System 100 wherein two or more HDCP Devices are interconnected through an HDCP-protected Interface 113. The Audiovisual Content protected by HDCP, HDCP Content 102, flows from an Upstream Content Control Function 110 into the HDCP System 100 at the most upstream Transmitter 112. From there, the HDCP Content 102, encrypted by the HDCP System 100, flows through a tree-shaped topology of HDCP Receivers 114 over HDCP-protected Interfaces 113. HDCP Receivers may be HDCP Repeaters 116 that serve as downstream HDCP Transmitters emitting the HDCP Content 102 further downstream to one or more additional HDCP Receivers 118.

HDCP is sometimes required to be enabled if a DVI display is used. However, that requirement degrades the performance of the digital content 102, particularly during a rapid channel change process (surfing). HDCP authentication is dependent on video attributes such as resolution and aspect ratio. Since channel changes result in new video attributes and potentially new resolutions such as the ATSC resolution standards 480p, 720p and 1080i, and aspect ratios, such as 4×3 (full-screen) or 16×9 (wide-screen), among others, there is a need for HDCP re-authentication for each channel change.

HDCP is designed to protect the transmission of Audiovisual Content 102 between an HDCP Transmitter 112 and an HDCP Receiver 114. The system also allows for HDCP Repeaters 116 that support Downstream HDCP-protected Interface Ports 120. There are three facets of the content protection system. First, there is the authentication protocol, through which the HDCP Transmitter verifies that a given HDCP Receiver is licensed to receive HDCP Content. With the legitimacy of the HDCP Receiver determined, encrypted HDCP Content is transmitted between the two devices based on shared secrets established during the authentication protocol. The use of such shared secrets prevents eavesdropping devices from utilizing the content. Finally, in the event that legitimate devices are compromised to permit unauthorized use of HDCP Content, renewability allows a HDCP Transmitter to identify such compromised devices and prevent the transmission of HDCP Content.

The HDCP Authentication protocol is an exchange between an HDCP Transmitter and an HDCP Receiver that affirms to the HDCP Transmitter that the HDCP Receiver is authorized to receive HDCP Content. That affirmation is in the form of the HDCP Receiver demonstrating knowledge of a set of secret device keys 208. Each HDCP Device is provided with a unique set of secret device keys, referred to as the Device Private Keys, from Digital Content Protection, LLC. The communication exchange, which allows for the receiver to demonstrate knowledge of such secret device keys 208, also provides for both HDCP Devices to generate a shared secret value that cannot be determined by eavesdropping on that exchange. By having that shared secret information embedded into the demonstration of authorization, the shared secret can then be used as a symmetric key to encrypt HDCP Content intended only for the Authorized Device. Thus, a communication path is established between the HDCP Transmitter and HDCP Receiver that only Authorized Devices can access.

Thus, a heretofore, un-addressed need exists in the industry to address the aforementioned HDCP re-authentication process for each channel change.

Definitions

Audiovisual Content—Audiovisual works as defined in the U.S. Copyright Act as in effect on Jan. 1, 1978, text and graphic images.

Authorized Device—An HDCP Device that is permitted access to HDCP Content. An HDCP Transmitter may test if an attached HDCP Receiver is an Authorized Device by successfully completing the first and, when applicable, second part of the authentication protocol. If the authentication protocol successfully results in establishing authentication, then the other device is considered by the HDCP Transmitter to be an Authorized Device.

Downstream—Term used as an adjective to refer to being towards the sink of the HDCP Content stream.

DVI—Short for Digital Video (or Visual) Interface, a digital interface standard created by the Digital Display Working Group (DDWG) to accommodate both analog and digital monitors.

HDCP—High-Bandwidth Digital Content Protection.

HDCP Content—Consists of Audiovisual Content that is protected by the HDCP system. HDCP Content includes the Audiovisual Content in encrypted form as it is transferred from an HDCP Transmitter to an HDCP Receiver over an HDCP-protected Interface.

HDCP Device—Any device that contains one or more HDCP-protected Interface Ports and is designed in adherence to HDCP.

HDCP Encryption—The encryption technology of HDCP when applied to the protection of HDCP Content in an HDCP System.

HDCP-protected Interface—An interface for which HDCP applies. The Digital Visual Interface (DVI) in this application.

HDCP-protected Interface Port—A connection point on an HDCP Device that supports an HDCP-protected Interface.

HDCP Receiver—An HDCP Device that can receive and decrypt HDCP Content through one or more of its HDCP-protected Interface Ports.

HDCP Repeater—An HDCP Device that can receive and decrypt HDCP Content through one or more of its HDCP-protected Interface Ports, and can also re-encrypt and emit the HDCP Content through one or more of its HDCP-protected Interface Ports. An HDCP Repeater may also be referred to as either an HDCP Receiver or an HDCP Transmitter when referring to either the upstream side or the downstream side, respectively.

HDCP System—An HDCP System consists of an HDCP Transmitter and one or more HDCP Receivers connected through their HDCP-protected interfaces in a tree topology; whereas the HDCP Transmitter is the HDCP Device most upstream, and receives the HDCP Content from an Upstream Content Control Function. All HDCP Devices connected to other HDCP Devices in an HDCP System over HDCP-protected Interfaces are part of the HDCP System.

HDCP Transmitter—An HDCP Device that can encrypt and emit HDCP Content through one or more of its HDCP-protected Interface Ports.

HDMI—Short for High-Definition Multimedia Interface, an industry-supported, uncompressed, all-digital audio/video interface.

Upstream—Term used as an adjective to refer to being towards the source of the HDCP Content stream. The antonym of "downstream," defined above.

SUMMARY OF THE INVENTION

Embodiments of the present invention present a system and method for providing an HDCP authentication process during the channel change process by delaying the HDCP authentication until the surfing has stabilized.

Briefly described, in architecture, one embodiment of the system utilizes an algorithm that focuses on the detection of whether a display is HDCP capable on a DVI hot-plug event.

The solution described in this disclosure focuses on the detection of whether a display is HDCP capable on the DVI hot-plug event. If the display is HDCP capable, one can delay HDCP authentication for a few seconds during the channel change process until a user settles down from surfing. Once the surfing has subsided, the HDCP process is restarted, and a secure channel is created. If a secure channel cannot be created, a warning message is displayed, and the user does not see video.

Once the DVI display is disconnected, no HDCP related traffic takes place.

The present invention offers the following advantages over the prior art:
1. Does not impact channel change time during rapid surfing.
2. Remains secure even during rapid surfing.
3. Reduces likelihood of visual interruptions caused by HDCP re-negotiations during surfing.
4. Minimizes risk of display re-syncing during HDCP re-authentication process.

Other systems, method, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

Figure 3:
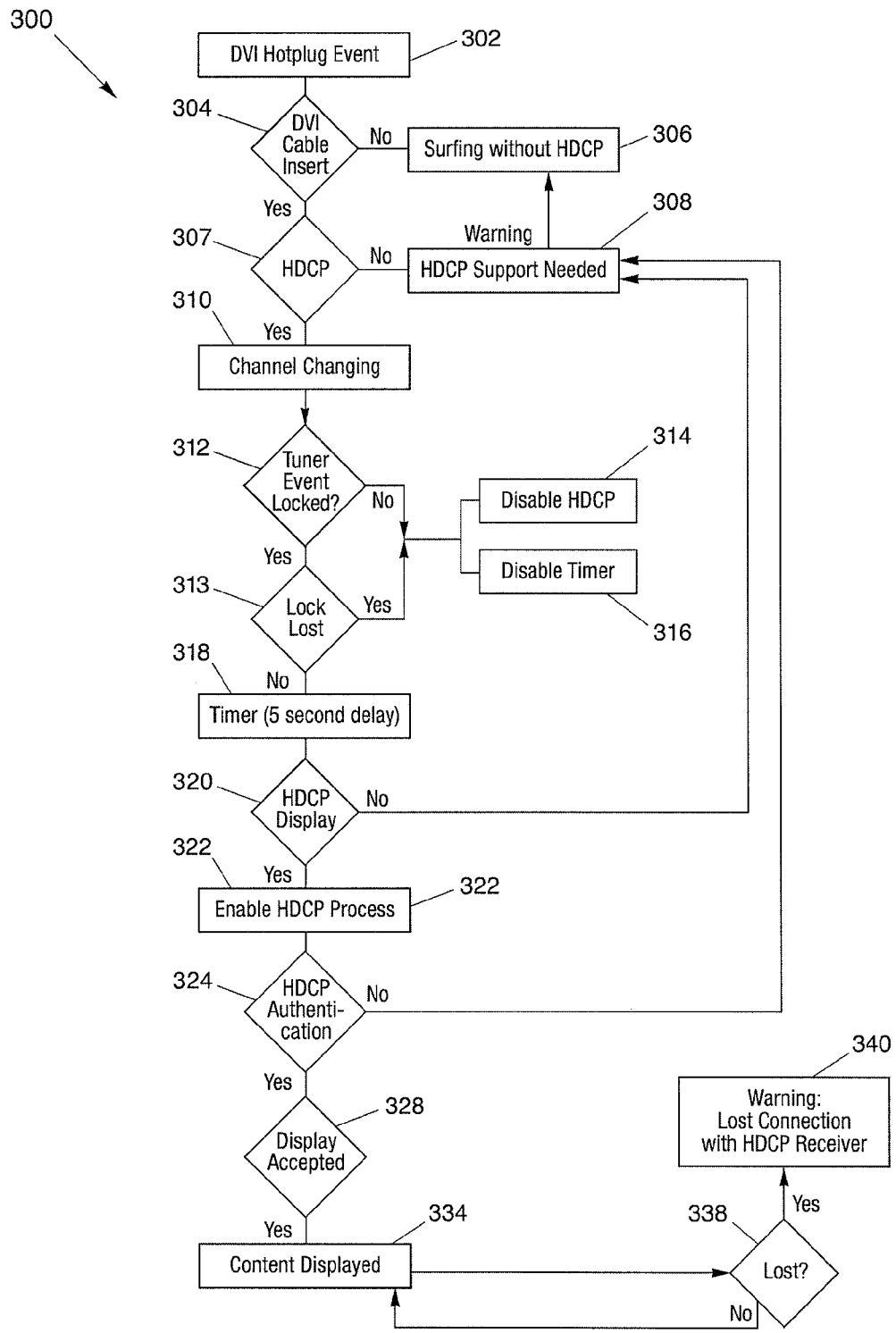
FIG. 3 is a flow chart of a preferred embodiment of an HDCP tuning algorithm.

The flow chart of FIG. 3 shows a preferred embodiment of the architecture, functionality, and operation of a possible implementation of the HDCP algorithm.

In the preferred embodiment, a DVI hot-plug event 302 is detected. The DVI hot-plug event 302 includes the determination of whether a DVI cable 304 is connected. If the DVI cable 304 is connected, the algorithm 300 proceeds to the determination as to the availability of HDCP 307. A first warning 308 is displayed if HDCP 307 is not available. Channel surfing (changing) 306 is permissible at this stage, but only via component or other non-copy-protected interfaces. If HDCP 307 is available, HDCP channel surfing 310 is enabled.

At the start of the channel changing 310, it is determined in step 312 whether a tuner event lock has occurred. The tuner event lock is indicative of a selection of a desired channel. When it is determined in step 312 that the tuner event lock has not occurred, or when it is determined in step 313 that the tuner event lock is lost, HDCP is disabled at step 314, and a timer 318 is also disabled. The timer 318 is enabled if the tuner event lock 312 is locked. In the preferred embodiment, the timer 318 includes a five-second delay before an enablement. However, that five-second time delay is arbitrary and could be replaced with any reasonable time delay known to those skilled in the art.

Figure 1:
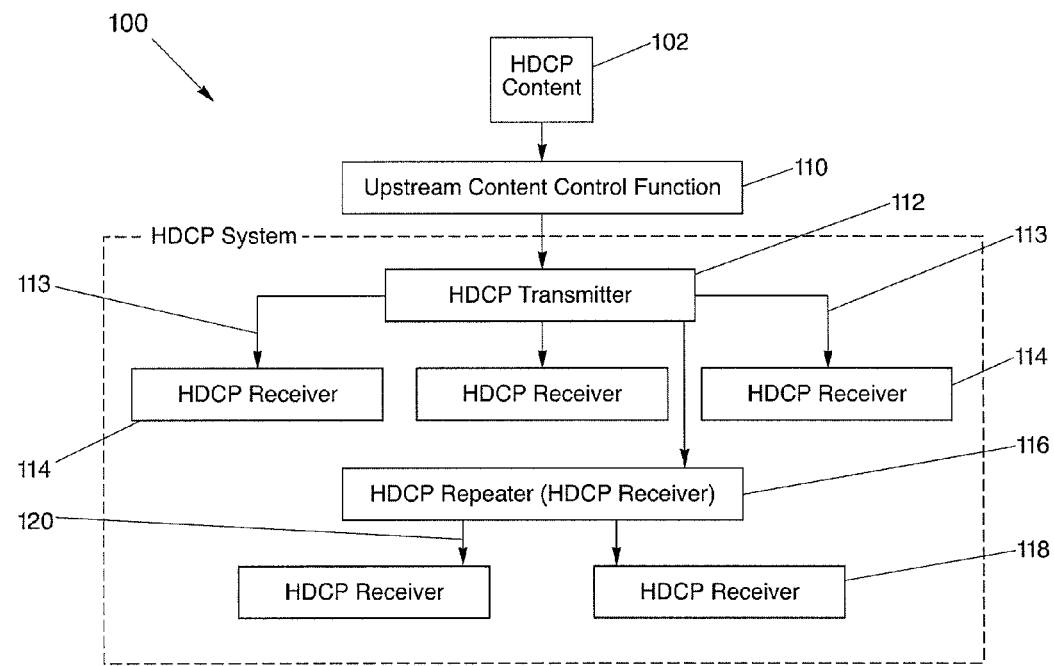
FIG. 1 is a block diagram of a typical HDCP system.
Figure 2:
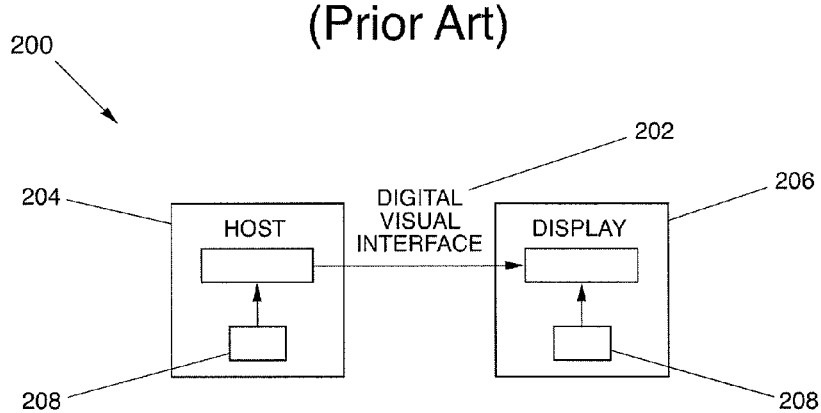
FIG. 2 is a block diagram of a basic HDCP system.

After the delay of a predetermined time period, the algorithm 300 determines in step 320 whether a secure HDCP session can be established. If not, the first warning 308 is again displayed. If it is determined in step 320 that the display is HDCP capable, then an HDCP authentication process 322 is enabled. An HDCP authentication determination 324 permits a plurality of attempts, the number of attempts being pre-selected. If authentication, which involves the mutual recognition of service keys 208 (FIG. 2) between a video source (FIG. 2) and the display (FIG. 2), is not available after the plurality of attempts, the first warning 308 is displayed. If the communication with the HDCP display is accepted at step 328, the content is displayed at step 334. If it is determined in step 338 that communication with the HDCP display has been lost, a warning to that effect is displayed at step 340.

The following is a pseudo-code representation of the operation of the preferred embodiment.

DVI-Hot-Plug Event
  Is DVI cable inserted?
  Yes
    Check to see if it's HDCP
      If HDCP
        Permit surfing
      Not HDCP
        Display warning message (HDCP support required)
  No
    Set flag to enable surfing without HDCP for each channel change.

Tuner Lost Lock (i.e. Surf Off Channel)
  If HDCP active
  Disable HDCP
  If HDCP timer active
  Disable timer Tuner Locked Event
   If HDCP enabled flag is set
     Start HDCP timer (do not enable HDCP)
       Timer typically starts in 5 seconds HDCP Process
   Check if display is HDCP
   Yes
     Perform HDCP session setup
   No
     Display warning message (HDCP support required)

HDCP Timer
   Start HDCP process
   Did it fail more than 3 times?
   Display warning message (unable to establish HDCP support)

HDCP Authentication Revoked Event (Secure Communication Lost)
   Restart HDCP timer The invention can be implemented in a DVI- or HDMI-capable set-top box.

While the invention has been disclosed for use with HDCP, it can be used with any other security protocol that satisfies the following two attributes. The first attribute is that the security protocol is tied to the video content being transmitted; that is, if the video attributes change, the security protocol must be renegotiated. The second attribute is that the security protocol offers a way to determine or detect whether the remote device is capable of supporting the security protocol.

Any process descriptions or blocks in flow charts should be understood as representing modules, segments, or portions of code that include one or more executable instructions for implementing specific logical functions or steps in the process. Alternate implementations are included within the scope of the preferred embodiment of the present invention in which functions may be executed out of order from that shown or discussed, including substantial concurrence or reverse order, depending on the functionality involved, as would be understood by those reasonably skilled in the art of the present invention. Also, steps disclosed as separate may be performed concurrently or combined, and a step shown as discrete may be performed as two or more steps. Furthermore, numerical values and disclosures of specific hardware are illustrative rather than limiting. Moreover, while the preferred embodiment has been disclosed in the context of DVI, the invention can be implemented for use with another suitable interface that uses HDCP, such as HDMI or any substantially DVI-like interference. Therefore, the present invention should be construed as limited only by the appended claims.

I claim:

1. A method for enabling a security protocol for transmission from a transmitter to a receiver during a channel change process, comprising:
   allowing the transmitter to transmit data to the receiver so as to detect whether the receiver supports the security protocol;
   upon communication from the receiver to the transmitter that the receiver supports the security protocol, permitting a channel change process to proceed;
   permitting the transmitter to delay an authentication of the communication from the receiver under the security protocol until the channel change process is completed; and
   enabling the authentication after a predetermined lapse of time.

2. The method of claim 1, further comprising using a hot-plug event to detect whether the receiver supports the security protocol.

3. The method of claim 2, wherein the hot-plug event is a Digital Video Interface hot-plug event, and further comprising determining whether a Digital Video Interface is connected.

4. The method of claim 1, further comprising displaying a first warning message if the receiver does not support the security protocol.

5. The method of claim 1, further comprising allowing the channel change process to proceed without the security protocol.

6. The method of claim 1, further comprising initiating a timer during the channel change process.

7. The method of claim 6, further comprising enabling the authentication after the timer has reached the predetermined lapse of time.

8. The method of claim 1, further comprising indicating a second warning when communication is lost with the receiver.

9. The method of claim 1, wherein the receiver includes a display.

10. The method of claim 1, further comprising restarting the authentication if secure communication is lost after the channel change process.

11. The method of claim 1, wherein the security protocol comprises High-Bandwidth Digital Content Protection.

12. A system for providing a security protocol during rapid channel changing utilizing a Digital Video Interface event as a starting point, the system comprising:
   a detector for detecting whether a display supports the security protocol; and
   a controller in communication with the detector for:
   (i) permitting a channel change process upon detection that the display supports the security protocol;
   (ii) delaying an authentication under the security protocol until the channel change process is completed; and
   (iii) enabling the authentication after a predetermined lapse of time.

13. The system of claim 12, further comprising a timer utilized in delaying the authentication.

14. The system of claim 12, wherein the controller uses a Digital Video Interface event as a starting point, and wherein the Digital Video Interface event includes a connection of a Digital Video Interface.

15. The system of claim 12, further comprising a display controlling device for displaying a plurality of warning messages when the security protocol is required and not available.

16. The system of claim 12, wherein the security protocol comprises High-Bandwidth Digital Content Protection.

17. The method of claim 2, wherein the hot-plug event is a High-Definition Multimedia Interface hot-plug event, and further comprising determining whether a High-Definition Multimedia Interface is connected.

18. The system of claim 12, wherein the controller uses a High-Definition Multimedia Interface event as a starting point, and wherein the High-Definition Multimedia Interface event includes a connection of a High-Definition Multimedia Interface.

* * * * *